United States Patent [19]

Tandon

[11] Patent Number: 5,113,260
[45] Date of Patent: May 12, 1992

[54] SENSOR ARRAY FOR BOTH SYNCHRONOUS AND ASYNCHRONOUS OPERATION

[75] Inventor: Jagdish C. Tandon, Fairport, N.Y.

[73] Assignee: Xerox Corporation, Stamford, Conn.

[21] Appl. No.: 632,816

[22] Filed: Dec. 24, 1990

[51] Int. Cl.⁵ .......... H04N 5/335; H04N 3/14
[52] U.S. Cl. .......... 358/213.11; 358/213.31; 358/213.27; 358/474
[58] Field of Search .......... 358/213.11, 213.23, 358/213.25, 213.26, 213.29, 213.31, 212, 214, 216, 213.15, 213.16, 213.18, 213.27, 474, 482, 483, 497

[56] References Cited

U.S. PATENT DOCUMENTS

| | | | |
|---|---|---|---|
| 4,562,475 | 12/1985 | Levine | 358/213.26 |
| 4,737,854 | 4/1988 | Tandon et al. | 358/213.31 |
| 4,748,514 | 5/1988 | Bell | 358/486 |
| 4,771,333 | 9/1988 | Michaels | 358/213.29 |
| 4,878,119 | 10/1989 | Beikirch et al. | 358/471 |
| 4,922,337 | 5/1990 | Hunt | 358/213.26 |

OTHER PUBLICATIONS

"A Low-Noise CCD Input with Reduced Sensitivity to Threshold Voltage", Emmons et al, Texas Instruments, Inc. pp. 233-235, Dec. 1974.
"Charge-coupled Devices and Systems", edited by M. J. Howes et al, published by J. Wiley & Sons, pp. 70-72.

Primary Examiner—Howard W. Britton
Assistant Examiner—Sherrie Hsia
Attorney, Agent, or Firm—Frederick E. McMullen

[57] ABSTRACT

A scanning array capable of both synchronous and asynchronous operation, the array, on a demand for a line of image signals, initiating a single clock cycle consisting of biasing the array sensors, integrating the image line, resetting the array output amplifiers, transferring the image signals obtained to the output amplifiers, and outputting the image signals from the amplifiers to the array output.

6 Claims, 7 Drawing Sheets

SENSOR ARRAY FOR BOTH SYNCHRONOUS AND ASYNCHRONOUS OPERATION

BACKGROUND OF THE INVENTION

The invention relates to image sensor arrays, and more particularly, to a sensor array which can be operated both synchronously and asynchronously.

Image sensor arrays typically comprise a linear array of photodiodes which raster scan an image bearing document and convert the microscopic image areas viewed by each photosite to image signal charges. Following an integration period, the image signal charges are amplified and transferred to a common output line or bus through successively actuated multiplexing transistors.

Image sensor arrays such as disclosed in U.S. Pat. No. 4,737,854 to Tandon et al, assigned to Xerox Corporation, the assignor of the present application, operate in a synchronous manner in which operation of the array is locked to the frequency of the array driving clock pulses. There, the array driving clock pulses continue uninterruptedly whenever power to the scanner with which the array is associated is turned on, the clock pulses providing an ever-repeating sequence of reset, transfer, and charge injection. When the scanner is dormant and no scanning is taking place, the video signals produced by the array are discarded or dumped.

While synchronous operation provides effective scanning, there are applications where asynchronous operation is desirable or when required as for example when the document scan line information needs to be collected and made available on command. One example of the need for asynchronous operation is a scanner which is connected to a computer. Usually, the computer can accept only small amounts of data at a time and it would be desirable to have the scanner only scan when the computer is ready to accept information.

In the prior art, the aforementioned U.S. Pat. No. 4,737,854 discloses an image sensor array with two-stage transfer employing two transistors in series for transferring the image signal charges developed on the array photodiodes to a source follower for later transfer to a common output line by a multiplexing transistor. A publication entitled "A Low-Noise CCD Input With Reduced Sensitivity to Threshold Voltage" by Emmons et al (Technical Digest of International Electron Devices Meeting, pp. 233-235, December 1974) discloses a CCD input structure in which the injected charge is obtained from the differences between two voltage levels at a capacitive node with both levels set using the same FET structure to cancel threshold differences. "Charge-coupled Devices and Systems", edited by M. J. Howes et al and published by John Wiley & Sons, pp. 70-72 further discusses and refers to the afore-cited Emmons et al article (identified as citation #46 in the Wiley & Sons publication).

Further in the prior art, U.S. Pat. Nos. 4,878,119 to Beikirch et al and 4,771,333 to Michaels disclose asynchronous type scanners in which CCD image sensors are operated in an asynchronous mode by ensuring that all the charge packets in the analog shift registers are removed before a new integration interval is started.

SUMMARY OF THE INVENTION

In contrast, the present invention provides a scanning array for both synchronous and asynchronous operation, the array having an array of sensors for converting images viewed by the sensors to image charges, output gates for converting the charges to video image signals, control gates for transferring the charges from the sensors to the output gates, and a source of reset potential for use in resetting the sensors; comprising the combination of: control means for operating the array in a predetermined timing sequence to scan the image line viewed by the array, the control means including means for injecting a predetermined bias on the sensors over a first timed interval, means for integrating the image line viewed by the array over a second timed interval, means for applying the reset potential to the output gates over a third timed interval, means for transferring charges accumulated on the sensors to the output gates over a fourth timed interval, and means for sequentially accessing the output gates to read the image signals over a fifth timed interval; the control means repeatedly operating the array through the predetermined timing sequence for each successive scan line for synchronous operation of the array; and means for stopping and starting the array in response to the presence or absence of the demand for image signals for asynchronous operation of the array.

DESCRIPTION OF THE PREFERRED EMBODIMENTS

In the ensuing description, all transistors shown are N-channel type. However, P-channel transistors may instead be used with appropriate voltage level changes as will be understood.

Figure 1:
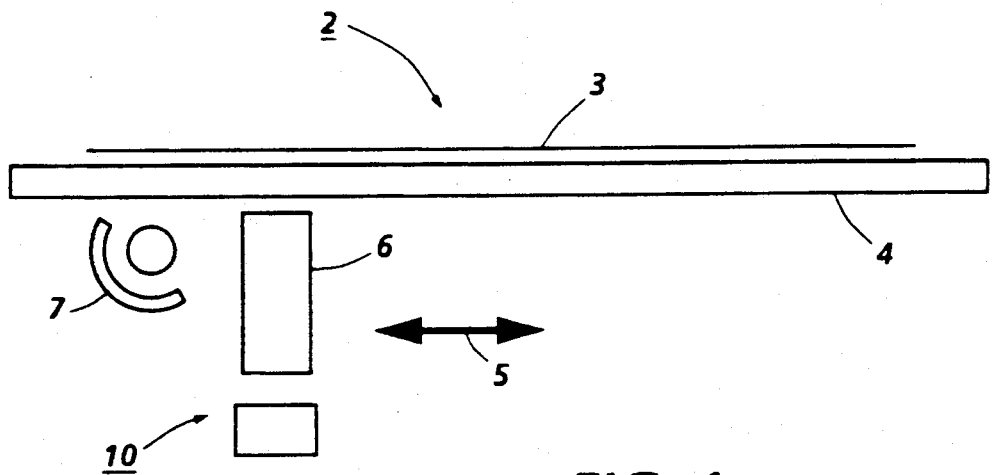
FIG. 1 is a schematic view of a raster input scanner having a full width array for both synchronous and asynchronous operation in accordance with the present invention.

Referring to FIG. 1, there is shown an exemplary raster input scanner, designated generally by the numeral 2, of the type adapted to use the synchronous-asynchronous scanning array 10 of the present invention. Array 10 comprises a linear full width array having a scan width in the fast scan direction substantially equal to or slightly greater than the width of the largest document 3 to be scanned. Documents to be scanned are supported on a generally rectangular transparent platen 4, typically glass, sized to accommodate the largest document original 3 to be scanned. As will be understood, a document 3 to be scanned is located either manually or by a suitable automatic document handler or feeder (not shown) on platen 4 for scanning. Array 10 is supported for reciprocating scanning movement in the slow scan direction depicted by arrows 5 below platen 4 by a movable scanning carriage (not shown). A gradient index fiber optic lens array 6 focuses array 10 on a line like area extending across the width of platen 4. One or more lamps 7 are provided for illuminating the line-like area on which array 10 is focused.

Figure 2:
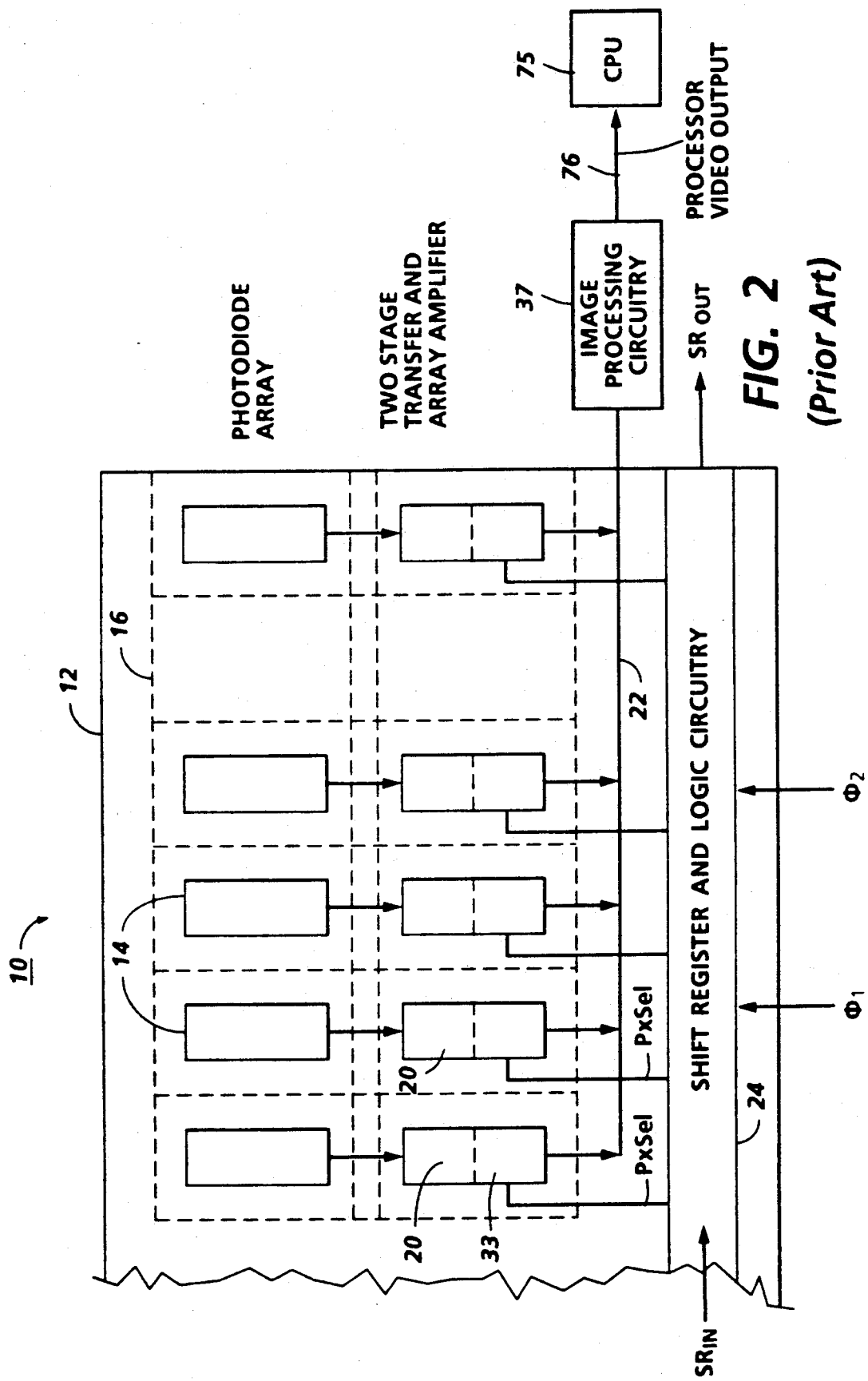
FIG. 2 is a schematic view depicting a prior art array of photosite cells with two stage transfer circuit adapted for synchronous operation.
Figure 3:
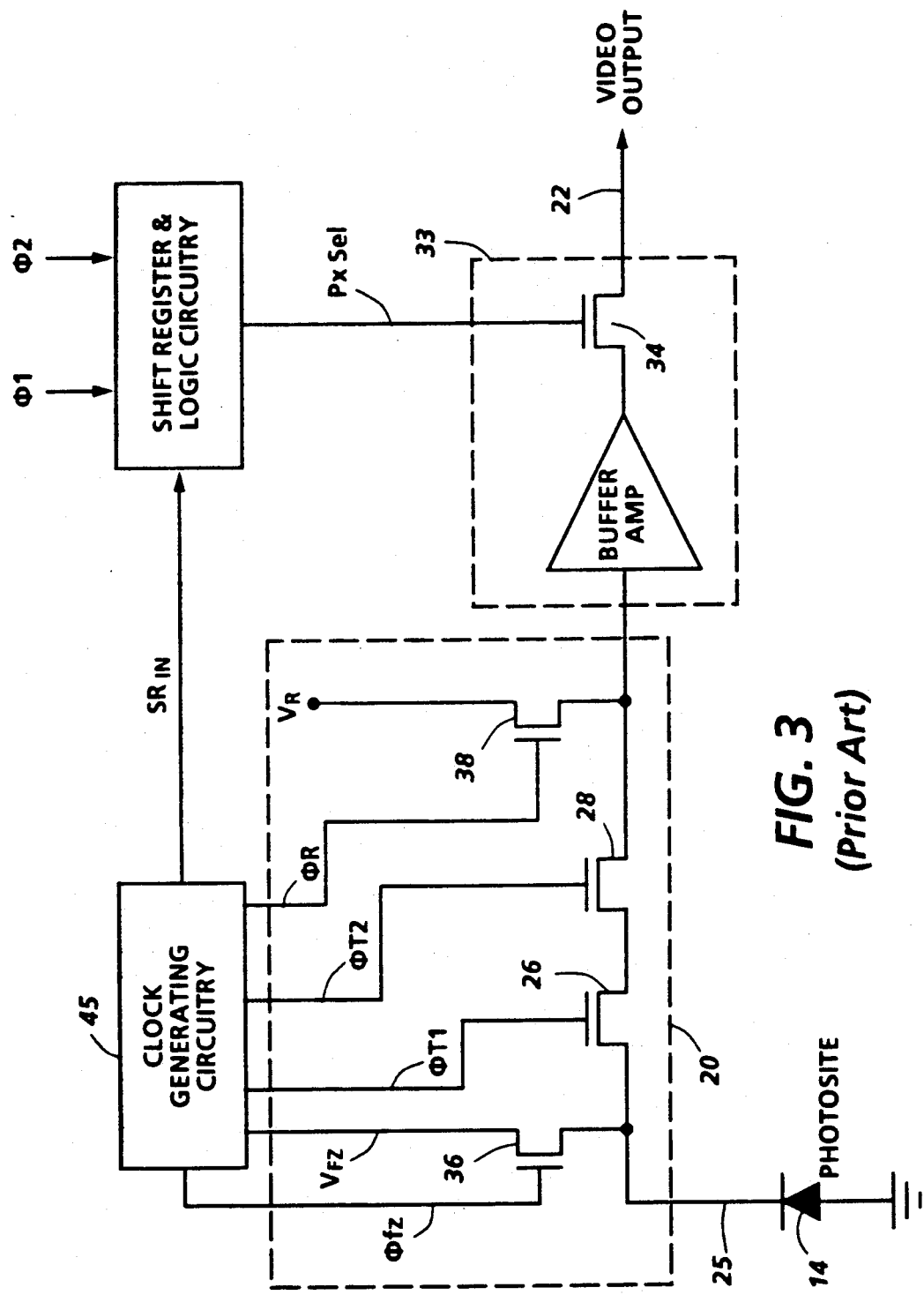
FIG. 3 is a circuit schematic showing details of a photosite cell for the array shown in FIG. 2.
Figure 4:
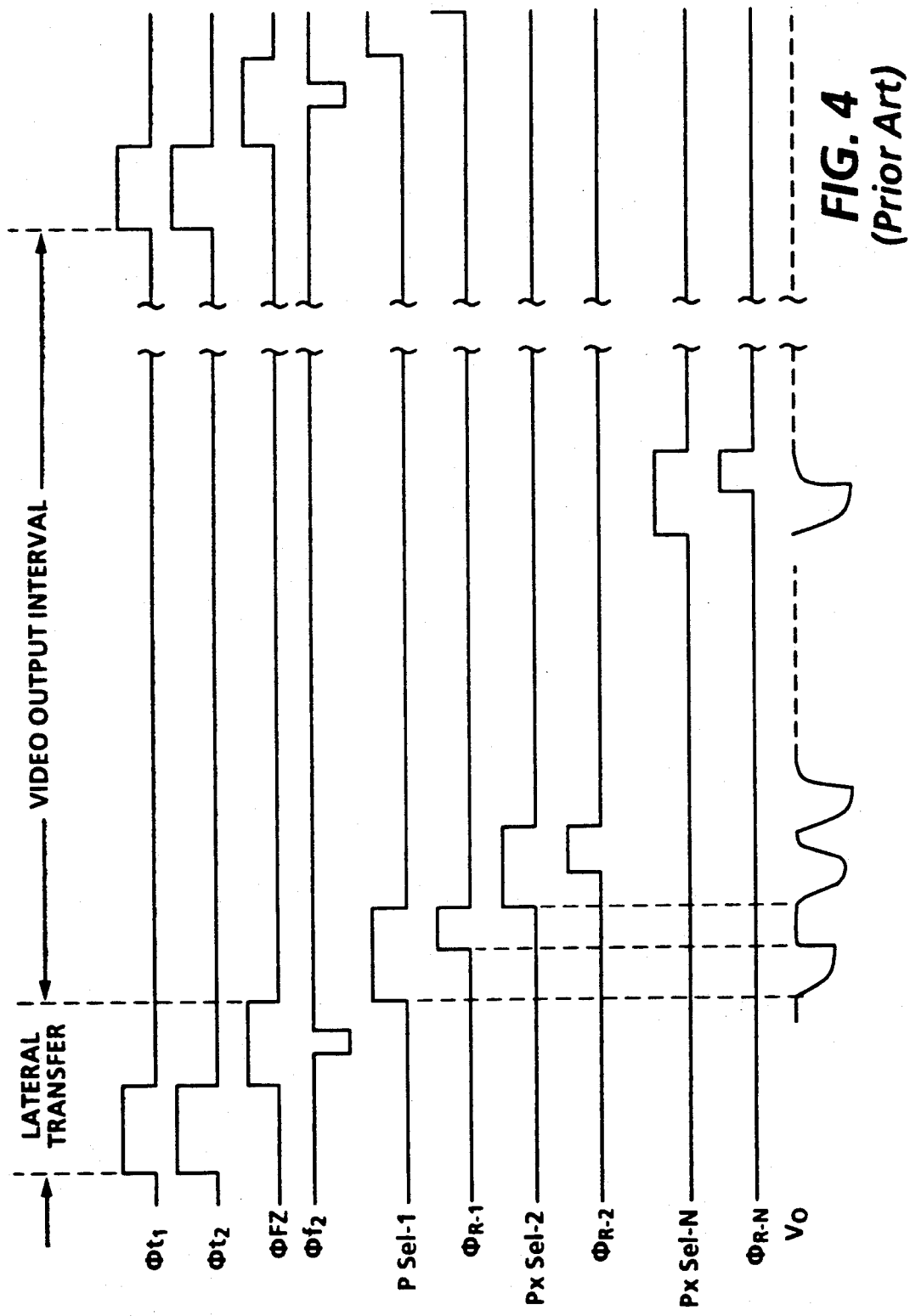
FIG. 4 is a timing diagram showing various voltage pulse waveforms for the synchronously operating array shown in FIG. 3.

Referring now to FIGS. 2-4, image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays can be abutted together end to end with one another to form the full width array 10, with spacing between the photodiodes at the butted ends the same as the spacing between the photodiodes inside the chip thereby maintaining photodiode pitch across the entire full width of the composite array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and a unity gain buffer amplifier 33 (seen in FIGS. 2 and 3) form a photosite cell at the array front end. Each transfer circuit has first and second stage transfer transistors 26, 28 for transferring the image signal charge from the photodiode 14 to amplifier 33. Transistors 26, 28 are in series with line 25 connecting one electrode of photodiode 14 with the input gate of amplifier 33. The other electrode of photodiode 14 is grounded.

A bias charge injection transistor 36 is provided to inject a bias charge or an electrical fat zero $V_{FZ}$, at photodiode 14. A reset transistor 38 controls the reset voltage $V_R$ to line 25 between transistor 28 and amplifier 33.

In each cell, the image signal charge from the photodiode is transferred via transistors 26 and 28 to amplifier 33. The voltage level developed at the low input capacitance of the unity gain buffer amplifier 33 is made available at a video output line 22 by sequentially selecting switches 34 with a pixel select clock PxSel. Clock pulses $\phi_1$, $\phi_2$, which are derived from a suitable source (not shown) which may reside either on chip 12 or off chip 12, drive the shift registers in the appropriate sequence. The image signal charges output to line 22 are input to a suitable image processing circuitry 37.

For synchronous arrays, a clock generating circuit 45 provides successive clock cycles for driving array 10. Each successive clock cycle has a reset pulse $\phi_r$ which applies a reset voltage $V_R$ to amplifiers 33 to reset amplifiers 33, clock transfer pulses $\phi_{t1}$, $\phi_{t2}$ which actuate transistors 26, 28 to transfer the current charge on photodiodes 14 to amplifiers 33, charge injection pulses $\phi_{fz}$ which actuate transistors 36 to inject bias $V_{FZ}$ onto photodiodes 14, and shift register pulses $SR_{IN}$ which generates pixel select pulses PxSel to connect the outputs of amplifiers 33 to video output line 22. During the period while the outputs of the amplifiers are being sequentially output to line 22, the new charges for the next clock cycle are being integrated on photodiodes 14.

When scanning a document, the document 3 to be scanned is positioned on platen 4 and scanner 2 actuated to cause scanning array 10 to scan the length of platen 4 and the document 3 thereon in the slow scan direction that is normally perpendicular to the linear axis of array 10. At the same time, the array scans the document original line by line in the fast scan direction parallel to the linear axis of the array. The image line being scanned is illuminated by lamp 7 and focused onto the photodiodes 14 by lens array 6. During an integration period, a charge is developed on each photodiode proportional to the reflectance of the image area viewed by each photodiode. The image signal charges are thereafter transferred to amplifiers 33 for sequential output to bus 22 and to image processing circuit 36 in a predetermined step by step timed sequence in response to shift register signals PxSel.

Where no document is being scanned and scanner 10 is not scanning, image processing circuitry 36 is in a quiescent state. In this state, the image signal charges output to video output line 22 are discarded.

Scanning arrays such as the array shown in the aforecited U.S. Pat. No. 4,737,854 to Tandon et al are synchronous arrays in which the array is locked in step with the frequency of the clock pulses output by the array clock generating circuitry 45. The array clock generating circuitry is started when power is turned on to scanner 10, the clock generating circuitry thereafter continuously outputting clock pulses to array 10 so long as power to the scanner is maintained. While synchronous arrays of the type described above provide effective scanning, there are applications where asynchronous operation is desirable or even required. In those instances, the document scan line information needs to be collected and made available on command.

Figure 5:
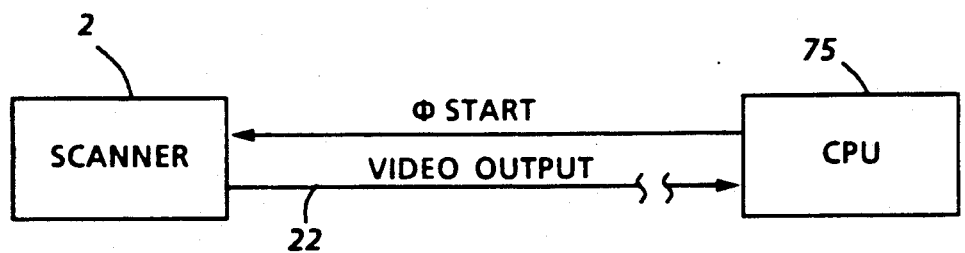
FIG. 5 is a schematic view showing the scanner of FIG. 1 coupled to a computer.

Referring to FIG. 5, one example of such need for an asynchronously operating array occurs where a scanner such as scanner 2 is connected to a computer such as a personal computer 75. Usually computers such as computer 75 can accept only small amounts of data at a time. Thus, it is desirable that scanner 2 be operated to only do scanning when computer 75 is ready to accept the data. Another example involves a scanner where the motion of the scan head is not very uniform and the samples taken in the slow scan direction (i.e., the motion direction) will be unevenly spaced if the sensor array were operated in a synchronous fashion.

Figure 6:
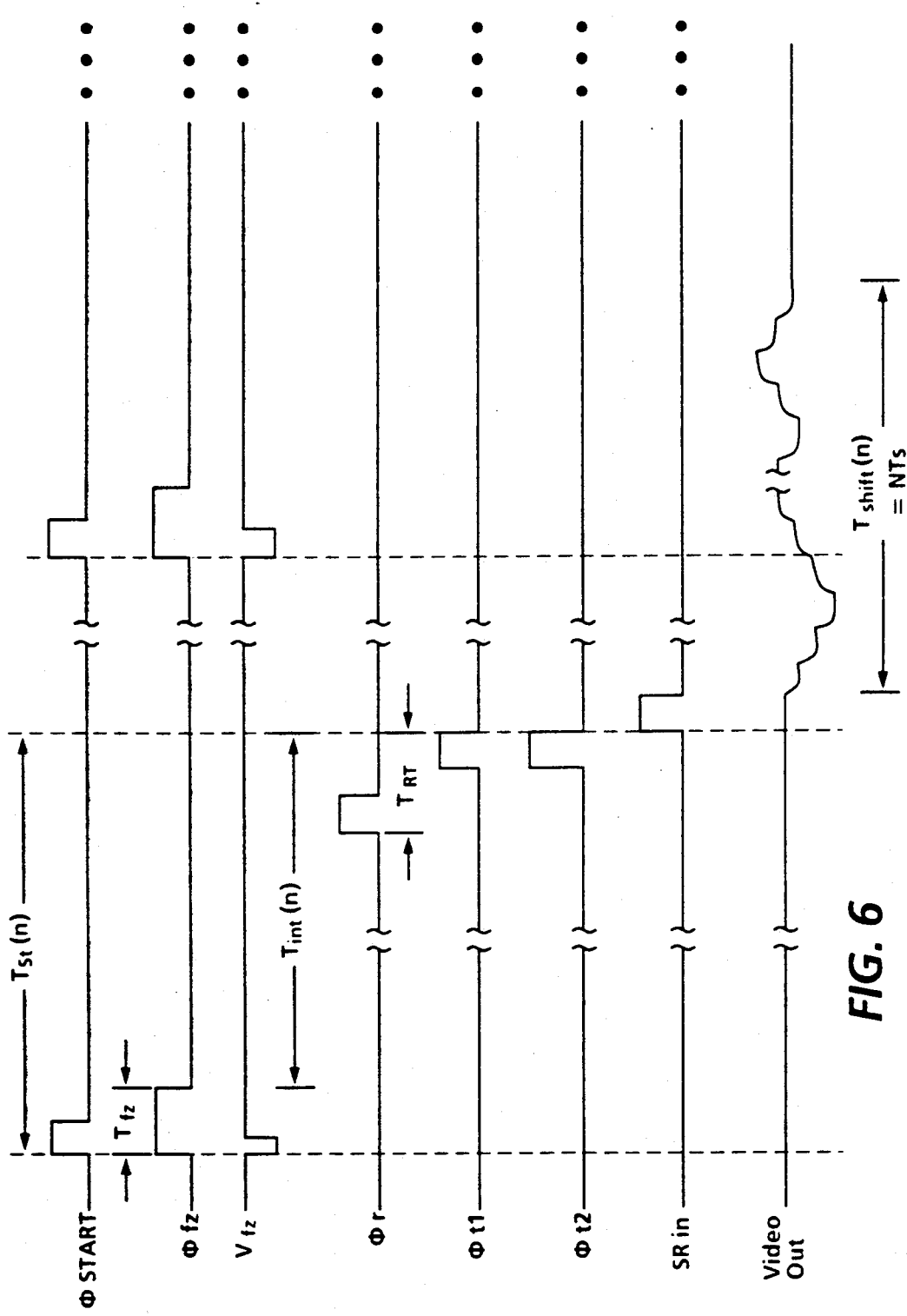
FIG. 6 is a timing diagram showing various clock pulse waveforms for the combined synchronous-asynchronous array of the present invention.

Referring to FIG. 6, to provide and array for both synchronous and asynchronous operation, array 10 is designed to accept and respond to a start pulse $\phi_{START}$ output by the user such as computer 75 on a demand for a line of image signals. On receipt of start pulse $\phi_{START}$, a single clock cycle is initiated during which the array 10 integrates the image content of a single line to provide a line of image signals for output to bus 22 and image processing circuitry 36. To effectuate this, the relative sequence between the clock pulses $\phi_r$, $\phi_{t1}$, $\phi_{t2}$, $\phi_{fz}$, and $SR_{IN}$ in clock cycle $\phi$ is changed so that, on receipt of start pulse $\phi_{START}$, a charge bias $V_{fz}$ is applied first to the photodiodes 14 in response to charge bias pulse $\phi_{fz}$. Following biasing of the array photodiodes pulse $\phi_{fz}$, an integration period $T_{INT}$ is entered during which the image line viewed by array 10 is integrated to provide image signal charges representative of the image on the array photodiodes 14. During the integration period $T_{INT}$ and before charge transfer, amplifiers 33 are reset by application of reset voltage $V_R$ in response to reset pulse $\phi_r$. Following the integration period, charge transfer pulses $\phi_{t1}$, $\phi_{t2}$, effect two stage transfer of the charges accumulated on photodiodes 14 to amplifiers 33. Shift register clock pulse $SR_{IN}$ generates pixel select pulses PxSel to connect the output voltages of amplifiers 33 to line 22 and image processing circuit 36. The processor video output of image processing circuitry 36 is output to CPU 75 via line 76.

Where $\phi_{START}$ is continuous, the clock cycles are repeated and array 10 operates as a synchronous array. Where $\phi_{START}$ is intermittent, array 10 operates as an asynchronous array.

The sequence of scanning is represented by the following relationships:

$$NT_s \leq (T_{int} - T_{RT}) \quad (1)$$

$$Min\ T_{st} = T_{fx} + T_{int} \quad (2)$$

$$T_{shift} = N \cdot T_s \quad (3)$$

where $T_{int}$ is the integration period, $T_{RT}$ is the reset period, $T_{shift}$ is the shift period during which output charges on the buffer amplifiers are read.

$T_{st}$ is the point at which start pulse $\phi_{START}$ is received, and $T_{fx}$ is the interval during which the charge bias pulse $\phi_{fx}$ is input.

Figure 7:
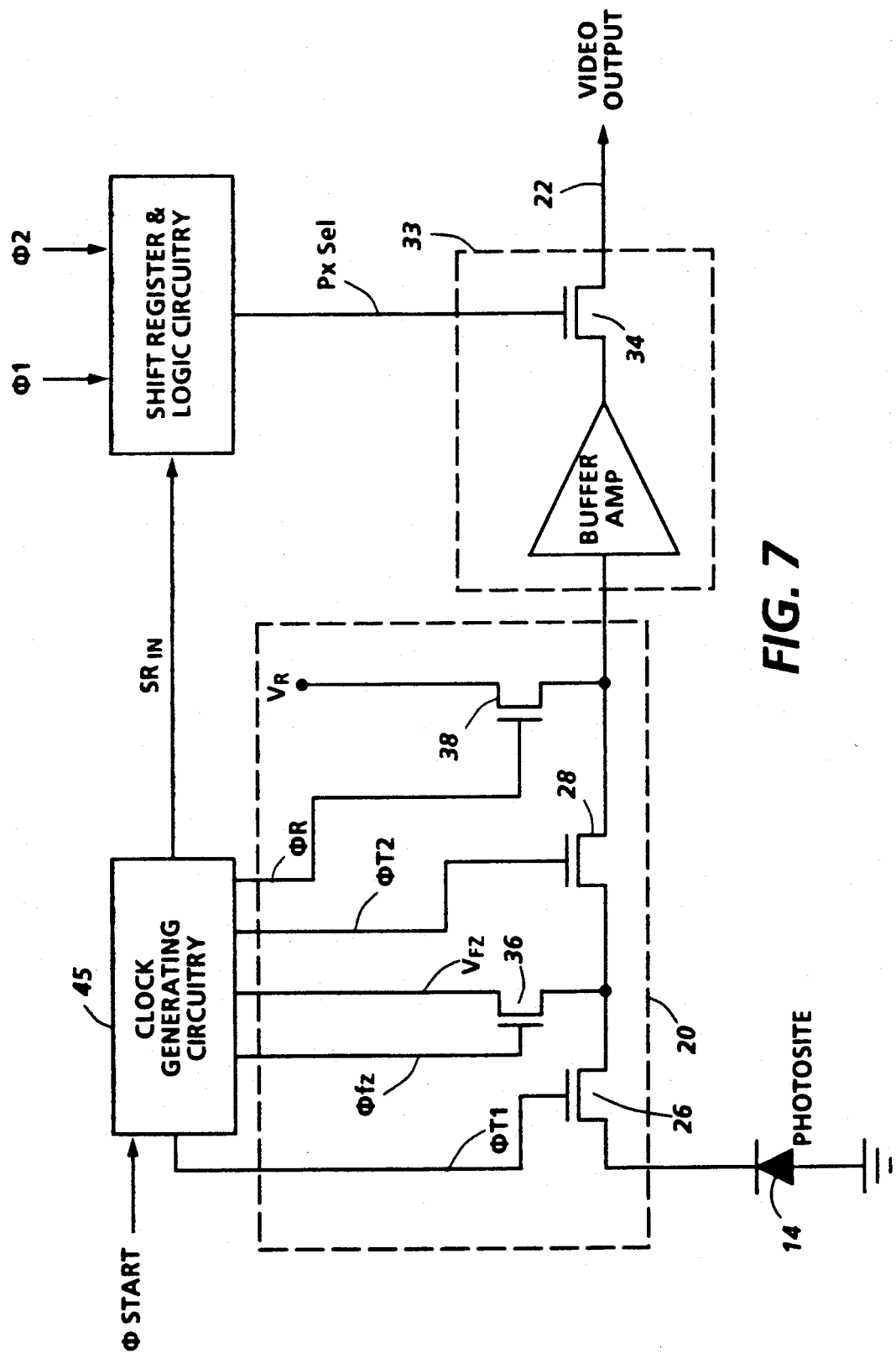
FIG. 7 is a schematic view of an array cell type with an alternate two stage transfer circuit.
Figure 8:
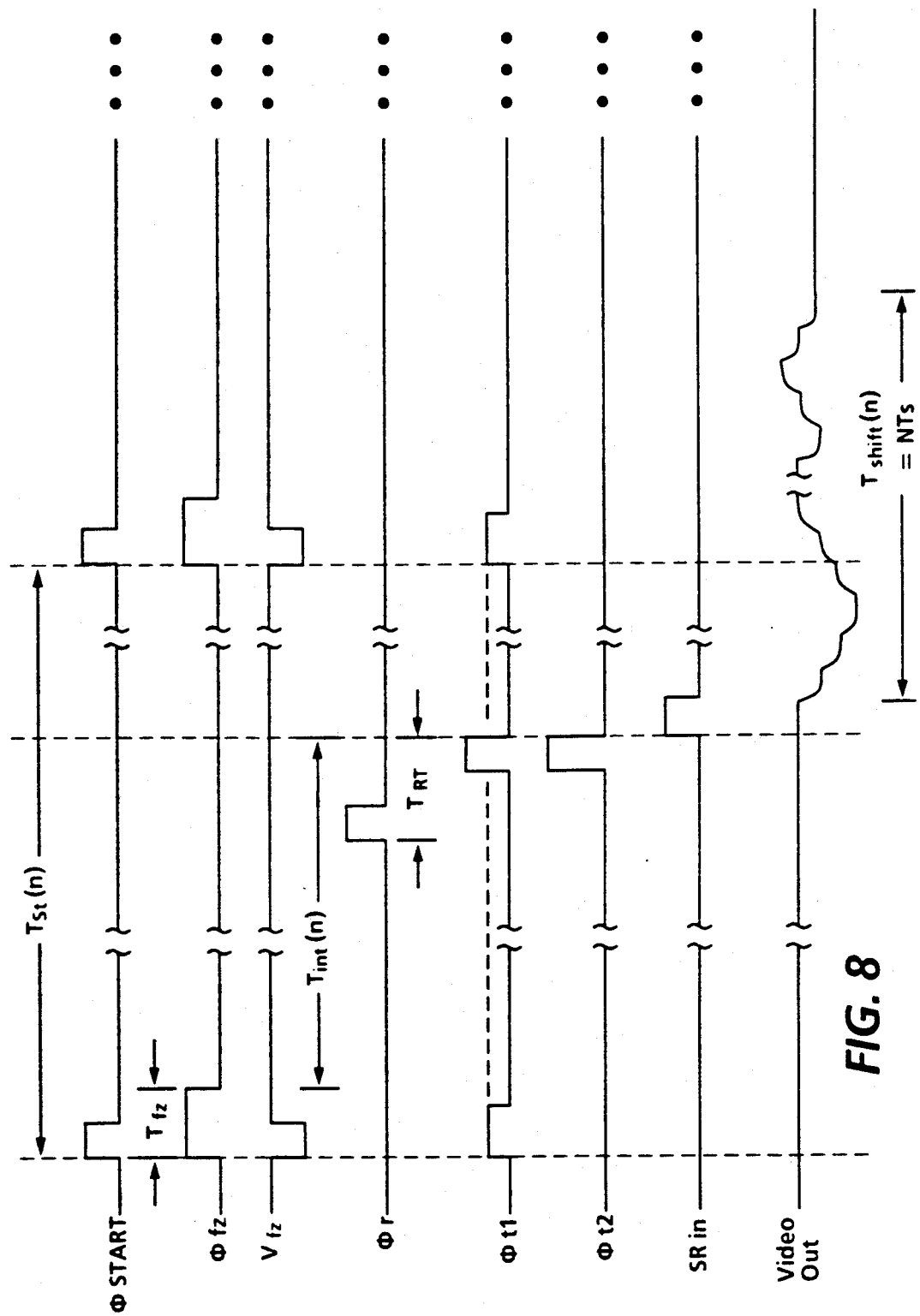
FIG. 8 is a timing diagram showing various clock pulse waveforms for operating the array type shown in FIG. 7 as a combined synchronous-asynchronous array.

In the embodiment shown in FIGS. 7 and 8, where like numbers refer to like parts, charge transistor 36 is located between two stage transistors 26, 28. In this embodiment, which is more fully explained in copending U.S. patent application Ser. No. 07/632,814 to Jagdish C. Tandon et al, and entitled "Image Sensor Array Using Two Stage Transfer Having Improved Uniformity", filed on Dec. 24, 1990 the disclosure of which is herein incorporated by reference, transistors 26 are actuated twice, once during the image signal charge transfer cycle and again during the charge injection cycle. For this, the amplitude of the pulse $\phi_{t1}$ applied to transistors 26 during the image charge cycle is less than the amplitude of the pulse $\phi_{t1}$ applied during the image signal charge transfer cycle.

On a start pulse $\phi_{START}$ output by the user such as computer 75 on a demand for a line of image signals, a single clock cycle is initiated during which the array 10 integrates the image content of a single line for output to bus 22 and image processing circuit 36. On receipt of start pulse $\phi_{START}$, a relatively low pulse $\phi_{t1}$ is applied to transistors 26 to enable charge bias $V_{fx}$ to be applied to the photodiodes 14 in response to charge bias pulse $\phi_{fx}$. Following biasing of the array photodiodes 14, an integration period $T_{INT}$ is entered during which the image line viewed by array 10 is integrated to provide image signal charges representative of the image on the array photodiodes 14. During the integration period $T_{INT}$ and before charge transfer, amplifiers 33 are reset by application of reset voltage $V_R$ in response to reset pulse $\phi_r$. Following the integration period, relatively higher amplitude charge transfer pulses $\phi_{t1}$, together with charge transfer pulses $\phi_{t2}$ effect two stage transfer of the charges accumulated on photodiodes 14 to amplifiers 33. Shift register clock pulse $SR_{IN}$ generates pixel select pulses PxSel to connect the output voltages of amplifiers 33 to line 22 and image processing circuit 36.

In the FIGS. 7 and 8 embodiment, array 10 operates as a synchronous array so long as the start pulse $\phi_{START}$ continuous without interruption. Where the start pulse $\phi_{START}$ is intermittent, array 10 operates as an asynchronous array.

While the invention has been described with reference to the structure disclosed, it is not confined to the details set forth, but is intended to cover such modifications or changes as may come within the scope of the following claims.

I claim:

1. A scanning array for both synchronous and asynchronous operation, said array having an array of sensors for converting images viewed by said sensors to image charges, output gates for converting said charges to video image signals, control gates for transferring said charges from said sensors to said output gates, and a source of reset potential for use in resetting said sensor; comprising the combination of:
   a) control means for operating said array in a predetermined timing sequence to scan an image line viewed by said array, said control means including
      means for injecting a predetermined bias on said sensors over a first timed interval;
      means for integrating the image line viewed by said array over a second timed interval;
      means for applying said reset potential to said output gates over a third timed interval;
      means for transferring charges accumulated on said sensors to said output gates over a fourth timed interval; and
      means for sequentially accessing said output gates to read said image signals over a fifth timed interval;
   b) said control means repeatedly operating said array through said predetermined timing sequence for each successive scan line for synchronous operation of said array; and
   c) means for stopping and starting said array in response to the presence or absence of a demand for image signals for asynchronous operation of said array.

2. A method of controlling a scanning array to enable said array to perform scanning synchronously an asynchronously, said scanning array having photodiodes for converting images viewed by said photodiodes to image charges, buffer amplifier means for converting said charges to provide video image signals, control gates for transferring said charges from said photodiodes to said buffer amplifier means, a reset potential for resetting said photodiodes, and clock means for clocking said array, comprising the steps of:
   a) starting said array in response to a demand for image signals;
   b) in response to starting said array,
      1) biasing said array photodiodes to ready said photodiodes to scan an image line viewed by said photodiodes;
      2) integrating charges representative of the image line viewed by said photodiodes;
      3) resetting said buffer amplifier means;
      4) transferring the charges accumulated on said photodiodes to said buffer amplifier means; and
      5) reading the video image signals sequentially on said buffer amplifier means;
   c) repeating steps 1-5 for each succeeding scan line so long as said demand for image signals continues uninterruptedly to provide an synchronously operating array; and d) interrupting steps 1-5 at step 5 in response to termination of a demand signal to provide an asynchronously operating array.

3. The process according to claim 2 in which said control gates comprise a first and a second transistor disposed in series with one another for effecting two stage transfer, including the steps of:
   a) providing said biasing to a node between said first transistor and said second transistor transistors;
   b) concurrently applying a biasing charge transfer pulse to said first transistor to inject said biasing onto said photodiodes;
   c) integrating charges from the scan line viewed by said photodiodes;
   d) applying said reset potential to a second node between said second transistor and said buffer amplifier means to reset said buffer amplifier means;
   e) transferring said photodiode charges to said buffer amplifier means by a charge transfer pulse having an amplitude different from the amplitude of said bias charge transfer pulse to pass said photodiode charges to said buffer amplifier means;
   f) reading the image signals sequentially on said buffer amplifier means; and
   g) repeating steps a-f for each succeeding scan line.

4. A process for controlling a scanning array to enable both synchronous and asynchronous scanning, said array having an array of photodiodes for scanning image lines to generate charges representative of the image scanned, amplifiers for converting said charges to video image signals, there being one of said amplifiers for each photodiode, a source of reset potential for resetting said amplifiers, switch means for transferring charges from said photodiodes to said amplifiers, and clocking means providing clock pulses for scanning said array, comprising the steps of:
   a) providing means to start said array in response to a demand for image signals;
   b) in response to starting said array, actuating said clocking means to generate a clock cycle for
      1) biasing said photodiodes;
      2) integrating fresh charges on said photodiodes representative of the image line viewed by said array of photodiodes;
      3) resetting said amplifiers;
      4) transferring charges accumulated on said photodiodes to said amplifiers; and
      5) reading the image signals on said amplifiers sequentially;
   c) repeating steps 1-5 so long as said demand for image signals continues without interruption to provide synchronous scanning; and
   d) interrupting said clock cycle and stopping said array in response to termination of said demand for image signals to provide asynchronous scanning.

5. A process for operating a scanning array either synchronously to provide a continuously repeated scanning sequence or asynchronously to provide an intermittent scanning sequence, said scanning array having sensors for converting images viewed by said sensors to image charges, output gates for converting said charges to provide video image signals, control gates for transferring said charges from said sensors to said output gates, a reset potential for resetting said sensors, and clock means for clocking said array, comprising the steps of:
   a) providing an array start pulse in response to a demand for image signals;
   b) in response to said start pulse, initiating an array scanning sequence consisting of
      1) injecting a bias onto said sensors;
      2) integrating an image line viewed by said sensors to provide image signal charges representative of the images viewed;
      3) injecting said reset potential onto said output gates to reset said output gates preparatory to transferring said image charges from said sensors to said output gates;
      4) transferring said image charges to said output gates; and
      5) sequentially looking at the video signals on said output gates;
   c) repeating steps 1-5 without interruption for synchronous scanning operation, and
   d) repeating steps 1-5 in response to the demand for image signals to provide asynchronous operation.

6. The process according to claim 5 in which said control gates comprise a first transistor and a second transistor disposed in series with one another for effecting two stage transfer, including the steps of:
   a) injecting said bias on a node between said first transistor and said second transistor transistors;
   b) applying a bias charge transfer pulse to said first transistor to inject said bias on said sensors;
   c) injecting said reset potential to a node between the second transistor and said output gates to reset said output gates; and
   d) transferring said image signal charges to said output gates using a charge transfer pulse having an amplitude different from the amplitude of said bias charge transfer pulse.

* * * * *